June 17, 1952  H. E. COBB ET AL  2,600,618
MAGNETIC UNLOADER AND PRESSURE SWITCH
Filed Feb. 9, 1949
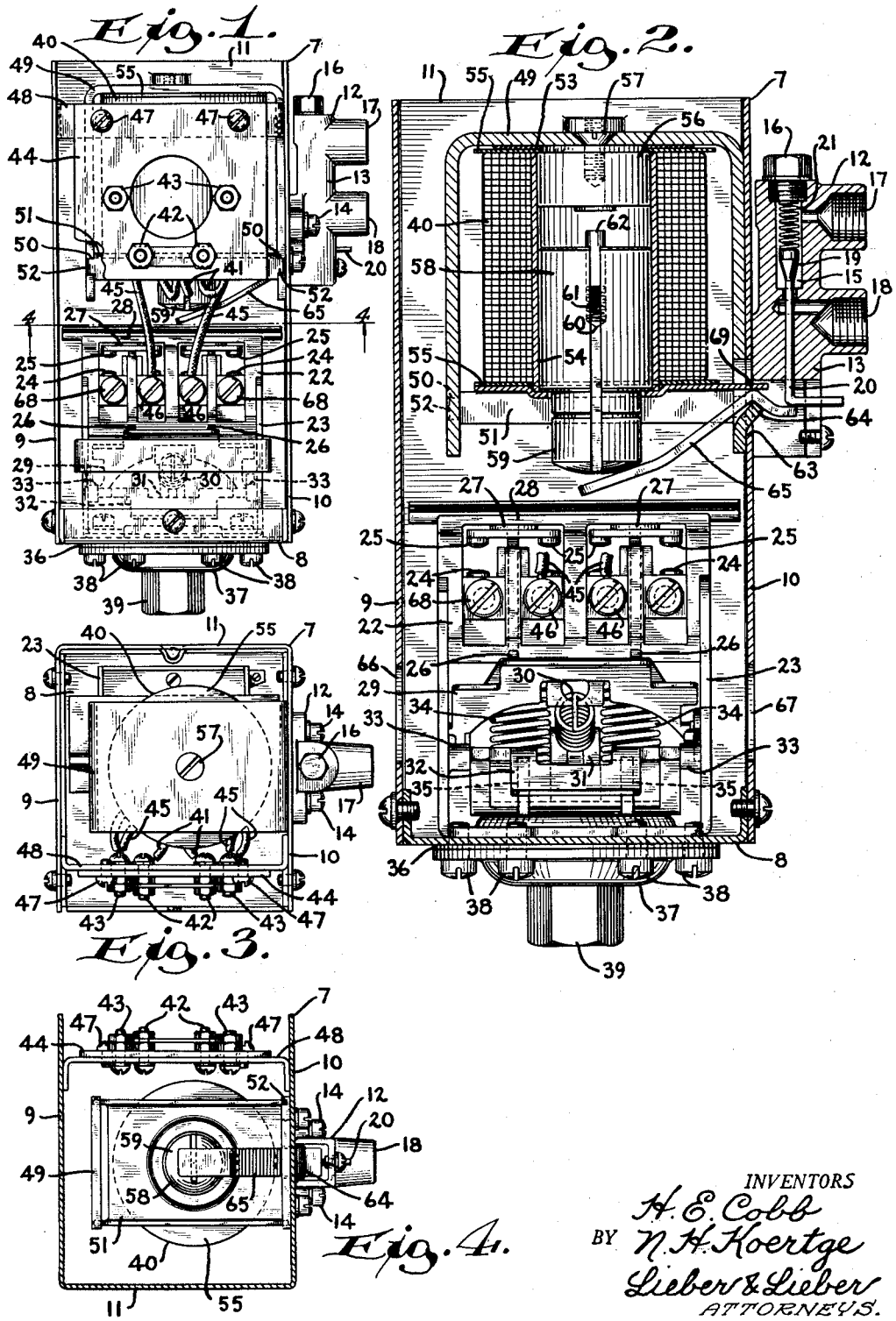
INVENTORS
H. E. Cobb
N. H. Koertge
BY Lieber & Lieber
ATTORNEYS.

Patented June 17, 1952

2,600,618

UNITED STATES PATENT OFFICE 2,600,618

MAGNETIC UNLOADER AND PRESSURE SWITCH

Harold E. Cobb, Aurora, and Nobel H. Koertge, Glen Ellyn, Ill., assignors to Furnas Electric Company, Batavia, Ill., a corporation of Illinois Application February 9, 1949, Serial No. 75,454

5 Claims. (Cl. 175—335)

Our invention relates generally to improvements in control mechanisms for electrically driven air compressors or the like, and relates more particularly to an improved combined magnetic and pressure actuated unloader for motor driven compressors.

The primary object of the present invention is to provide improved control mechanism for compressed air systems, which will effect automatic and positive unloading of the compressor not only when a predetermined maximum pressure has been attained in the system, but also in case of failure in compressor operation.

As shown in United States Patent No. 2,193,126, dated March 12, 1940, it has heretofore been proposed to provide a compressed air system which is supplied with air at predetermined pressure by an electric motor driven compressor, with an unloading valve operable by a pressure actuated toggle switch which causes the compressor driving motor to stop and also effects unloading of the compressor whenever a predetermined pressure is established in the system. While this prior pressure switch and unloading valve assemblage has proven highly successful and satisfactory in commercial operation, and does make provision for unloading of the compressor when driving motor is stopped as by failure of the electric power, the previous assemblage is relatively cumbersome and complicated by virtue of the fact that the magnetic valve actuator is disposed remote from the pressure switch assembly and contacts.

It is therefore an important object of our present invention to provide various improvements in details of construction of mechanism of the type shown in the above-identified patent, for automatically unloading a motor driven compressor whenever the compressor propelling motor stops especially due to power current failure.

Another important object of the present invention is to provide an improved combined air pressure and magnetically actuated unloading valve unit for electric motor driven air compressors, which is simple and compact in construction and which will automatically unload the compressor under diverse operating conditions.

A further important object of this invention is to provide a durable and highly flexible and reliable air compressor unloading assemblage which will effect automatic unloading of the compressor with the aid of a single unloading valve either when a predetermined definite pressure had been established in the compressed air discharge line, or when the compressor is stopped for other reasons than the establishment of such predetermined pressure; and which may be conveniently applied to a compressed air system.

Still another important object of the invention is to provide an automatic and highly efficient compressor unloader wherein the propelling motor of an electrically driven gas compressor will be relieved of undue starting torque by a pressure switch whenever the compressor delivery pressure has reached a definite maximum value, and by an electro-magnet in case of failure of the motor propelling current.

These and other objects and advantages of the invention will be apparent from the following detailed description.

A clear conception of the several features constituting our present improvement, and of the construction and operation of a typical commercial embodiment of the invention, may be had by referring to the drawing accompanying and forming a part of this specification wherein like reference characters designate the same or similar parts in the various views.

Fig. 1 is a front elevation of one of our improved magnetic unloading and pressure switch assemblages, with the normal closure cover removed from the switch and magnet housing;

Fig. 2 is an enlarged vertical section through the housing, magnet and unloading valve assemblage of the unloader shown in Fig. 1;

Fig. 3 is a top view of the improved unloading unit with the closure cover removed; and Fig. 4 is a transverse section through the same unit, taken along the line 4—4 of Fig. 1.

While the invention has been shown as being advantageously applicable to compressed air systems supplied with air under pressure by an electric motor driven compressor, it is not our desire or intent to unnecessarily restrict the utility of the improved features by virtue of this limited embodiment; and it is also contemplated that specific descriptive terms employed herein be given the broadest possible interpretation consistent with the disclosure.

Referring to the drawing, the improved magnetic unloader and pressure switch unit, comprises primarily a main casing or housing 7 having a base 8 and opposite side walls 9, 10 connected at the rear by a transverse wall 11; a compressor unloading valve 12 secured to the exterior of one of the housing side walls 10; an air pressure actuated toggle switch assemblage associated with the housing base 8 and being confined within the lower portion of the housing 7; and a magnetic unloading assemblage confined within the upper interior of the housing 7 above the toggle switch assembly. The open front and top of the housing 7 are adapted to be normally closed by an angular cover, not shown, and the unloading valve 12 and pressure switch assemblage are generally of the type shown in the prior patent above referred to.

The compressor unloading valve assemblage 12 comprises, in general, a body or fitting 13 secured to the side wall of the main casing 7 in any suitable manner, as by screws 14, and having a central bore 15 closed at its end by a cap screw 16 or the like and adapted for communication with the compressor, not shown, through a connection 15 and port 17 and with the atmosphere through another connection 18; and a valve 19 reciprocable within the bore 15 for opening and closing the passageway to the connection 18, the valve 19 being provided with an actuating stem 20 and being constantly urged toward lowermost closed position by the action of a compression spring 21 interposed between the valve and the cap screw 16.

The pressure actuated toggle switch assemblage confined within the lower portion of the housing 7 comprises, in general, a contact carrying block 22 mounted within the lower portion of the housing 7 a fixed distance above the base 8 thereof by means a U-shaped support 23; a series of fixed contacts 24 secured to the block 22; a like series of movable contacts 25 adatped to engage the fixed contacts 24 and carried in pairs by the upper ends of contact carriers 26 slidably supported in the block 22 and having their lower ends depending therefrom, the contacts 25 being constantly urged toward closed position by means of compression springs coacting therewith and recessed within sockets 27 for reaction against a top plate 28 formed of insulating material and secured to the carrier block 22; a toggle striker plate 29 fulcrumed in the side walls of the support 23 and having the swinging end thereof adapted to strike the depending ends of the contact carriers 26 to simultaneously move these carriers and their respective contacts 25 upwardly to break the circuits, the swinging end of the striker plate 29 being normally maintained in lowermost position away from the carriers 26 by means of a toggle tension spring 30 having one end attached to the swinging end of the plate 29 and its opposite end secured to the upstanding lug or ear 31 at the rear swinging end of a main substantially horizontal lever 32 fulcrumed at its front end on bearing blocks 33; a pair of laterally spaced vertical compression springs 34 also coacting with the swinging end of the lever 32 to constantly urge the same downwardly; a U-shaped motion transmitting member having the upwardly directed side pieces 35 thereof coacting with the medial portion of the lever 32, the member 35 being carried by a flexible diaphragm 36 for transmitting motion therefrom to the lever 32; and a suitable diaphragm closure 37 secured to the base 8 of the main housing 7 by means of screws 38 or the like, the closure plate 37 having a central threaded connection 39 for a fluid pressure supply pipe. The details of construction and mode of operation of this switch mechanism are all more particularly described in Patent No. 2,193,126, granted March 12, 1940, to W. C. Furnas and hereinabove referred to.

The improved magnetic unloading or valve actuating mechanism comprises an electro-magnetic winding or coil 40 having connections 41 to the terminals 42, 43 of a terminal board 44 which in turn are connected by wires 45 to terminals 46 associated with the fixed contacts 24, the terminal board 44 being rigidly secured by screws 47 or the like to a cross-piece 48 in the upper portion of the main casing 7 and the winding 40 also being supported within the upper portion of the casing 7 by means of an inverted U-shaped frame or bracket 49 secured to a wall 10 of the casing and provided with notches 50 in the lower ends of its side walls for receiving the reduced ends or ears 52 in the depending walls of a base plate 51 forming the support for the winding 40. The upper end of the winding 40 is insulated from the frame 49 by a non-magnetic gasket 53 or the like, and this winding is wound on a spool formed by the tube 54 and end plates 55 in an obvious manner with one of the end walls 55 of the spool resting on the plate 51 which is provided with an opening therein to the center of the tube 54 but of slightly less diameter than the tube bore. The upper end of the tube 54 is provided with a plug 56 which may be of magnetic material and secured in place by a non-magnetic screw 57 coacting with the frame 49; and a core member or plunger 58 is also housed within the tube 54 for vertical reciprocation therein, the member 58 having a reduced end 59 adapted to depend through the opening in the supporting plate 51 and also having a central bore 60 in its upper end adapted to house a compression spring 61 and a secondary plunger 62 cooperable with the plug 56 in a manner hereinafter more fully explained. The main casing wall 10 is provided with an opening 63 near the bottom of the valve body 13, and the side wall of the supporting frame 49 has a portion struck or bent outwardly therefrom as at 64 and extending through the opening 63 to provide a knife edge pivot or fulcrum edge for an actuating lever 65 having one end thereof cooperable with the member 58 below the reduced portion 59 thereof and the other end cooperable with the bottom of the valve stem 20.

Various parts of the improved assemblage may be readily produced in an obvious manner of sheet-material with the aid of punches and dies and a suitable L-shaped cover, not shown, may be provided for the front and top of the main casing 7. The walls 9, 10 of the main casing may be formed with lower openings 66, 67 for receiving the lead wires from a source of electricity, and these electric supply wires may be attached to the terminals 68 associated with the stationary contacts 24. Since the opening in the supporting plate 51 at the lower end of the magnetic winding 40 is of lesser diameter than that of the spool tube 54 and that of the enlarged portion of the core member 58, this plate forms a lower stop for the core member; and the plate 51 may likewise be provided with a reduced tongue portion 69 extending outwardly through the opening 63 in the side wall of the casing above the fulcrum 64 and lever 65 to positively position and retain the lever 65 against its knife-edge fulcrum.

In operation, the device is first adjusted, as fully disclosed in Patent No. 2,193,126, by adjusting the compression of the springs 34 so as to cause the contacts 24, 25 to separate or open at a pre-determined maximum pressure and to close when the pressure drops to a pre-determined minimum. The fitting 39 is, of course, normally connected to the storage reservoir of a compressor, and as long as the pressure in the reservoir is less than the pre-determined maximum, the diaphragm 36 will remain inactive due to the opposing force of the springs 34, and the levers 32, 33 will be maintained in lowermost position away from the contact carriers 26 so that the contacts 24, 25 will be closed. The magnetic winding 40 is therefore energized by virtue of its connections 45 with the fixed contacts 24 thereby magnetizing the plug 56 within the tube 54 of the winding which in turn raises, by magnetic attraction, the core member 58. As long as the contacts 24, 25 remain closed, the circuit will remain unbroken and the winding 40 will be energized to retain its core member against the upper stop-plug 56; and the spring 21, aided by the pressure existing in the line 17 of the valve assemblage 12, will obviously coact with the valve plug 19 to maintain this valve 19 seated against the atmospheric vent port. The pressure in the compressor reservoir will therefore build up until the predetermined maximum is reached; and when this maximum is attained, the diaphragm 36 will be actuated upwardly against the force of the spring 34, causing the motion transmitting member carried thereby to raise the lever 32 about its pivot to swing the end of the spring 30 across the center of the toggle and thereby trip the lever 29 upwardly about its pivot against the contact carriers 26. This obviously raises the contacts 25 away from the contacts 24, as shown, to open the circuit, thereby obviously deenergizing the magnetic winding 40 and releasing the magnetic attraction on the core member 58. Upon de-energization of the winding 40, the spring 61 which is under constant compression urges the plunger 62 upwardly against the plug 56 to positively release the member 58 from the plug 56 and to cause the same to drop by gravity within the tube 54. As the member 58 drops, the reduced end 59 thereof co-acts with the adjacent end of the lever 65 to swing this lever about its fulcrum point with the opposite end of the lever coacting with the lower end of the valve stem 20 to raise the valve 19 from its seat, thereby opening the bore 15 to atmosphere through the connection 18 and unloading the compressor in an obvious manner.

From the foregoing detailed description, it will be apparent that the present invention provides an improved magnetic unloader and pressure switch assemblage which is of simple construction and which is highly efficient and positive in actual operation. The improved assemblage results in an extremely compact unit wherein all parts are securely mounted and protected and which may be manufactured and assembled at relatively low cost. The improved magnetic actuating assemblage is extremely accurate and is quick to respond to predetermined variations in pressure. As hereinabove indicated, many of the parts such as the casing 7, base 8, frames 23, 49, base member 51, levers 32, 29 and 65, and diaphragm cover 37 may be readily stamped from sheet-material and the various parts are quickly and easily accessible upon removal of the cover. The spring 61 and plunger 62 are adapted to coact with the plug 56 to positively initiate movement of the plunger or core-member 58 upon de-energization of the magnet winding 40 and the lever 65 is adapted to respond quickly and positively, by virtue of its knife-edge fulcrum, to open the valve 19 and thereby unload the compressor. While the improved switch is especially adapted and has been hereinabove described as an efficient control unit for the operation of a motor driven compressor, the assemblage may obviously be utilized for other purposes and in instances wherein it is desired to control the fluid pressure operations within pre-determined ranges with utmost precision. The improved assemblage has proven highly successful and entirely practical in actual commercial use and it is extremely flexible in its adaptations.

It should be understood that it is not desired to limit this invention to the exact details of construction or to the precise mode of operation herein shown and described for various modifications within the scope of the claims may occur to persons skilled in the art to which this invention pertains.

We claim:

1. A pressure switch and magnet assemblage comprising, an upright elongated casing, a frame detachably secured within each end of said casing in superimposed relationship, pressure actuated switch mechanism mounted on one of said frames, an electromagnet winding mounted on the other of said frames and energized from said switch mechanism, a core member cooperable with said winding and reciprocable along a path parallel to the vertical axis of the assemblage upon energization and de-energization of said winding, and a valve actuating lever operable by said core member.

2. A pressure switch and magnet assemblage comprising, an upright elongated casing, a frame detachably secured within each end of said casing in superimposed and vertically alined relationship, pressure actuated switch mechanism mounted on one of said frames, an electro-magnet winding mounted on the other of said frames and energized from said switch mechanism, a core member cooperable with said winding and movable with its center of gravity approximately coinciding with the central vertical plane of the assemblage upon energization and de-energization of said winding, and a valve actuating lever operable by said core member.

3. A pressure switch and magnet assemblage comprising, a vertically elongated casing, a U-shaped frame detachably secured within each end of said casing in superimposed and vertically alined relationship and opening toward each other, pressure actuated switch mechanism mounted entirely on the lower one of said frames, an electro-magnet winding mounted entirely on the upper one of said frames and energized from said switch mechanism, a central core member cooperating with said winding and movable with its center of gravity approximately coinciding with the central vertical plane of the assemblage upon energization and de-energization of said winding, and a valve actuating lever disposed in the path of movement of said core member for operation thereby.

4. A switch controlled valve actuating mechanism comprising, a unitary inverted U-shaped sheet metal frame having a depending side wall, a lower portion of which is bent outwardly therefrom to form a knife edge projection and an opening adjoining said projection, an electromagnet winding having a base plate mounted on said frame, said base plate having a tongue portion extending outwardly of the frame side wall through said opening above the knife edge projection, means for energizing said winding, a core member cooperable with said winding and vertically movable upon energization thereof, and a valve actuating lever extending through said opening and fulcrumed on said knife edge projection below the outwardly extending tongue portion of said base plate and having a portion disposed in the path of movement of said core member for operation thereby.

5. A switch controlled valve actuating mechanism comprising, an upright elongated casing, a frame secured within each end of said casing in superimposed relationship, pressure actuated switch mechanism mounted on one of said frames, an electro-magnet winding mounted on the other of said frames and energized from said switch mechanism, said other frame being of unitary inverted U-shaped construction and having a depending side wall thereof formed with a lower opening and an adjoining outwardly bent portion forming a knife edge projection, a core member cooperable with said winding and reciprocable along a path parallel to the vertical axis of the assemblage upon energization and de-energization of said winding, and a valve actuating lever extending through the side wall opening of said U-shaped frame and fulcrumed on said knife edge projection and having a portion disposed in the path of movement of said core member for operation thereby.

HAROLD E. COBB.
NOBEL H. KOERTGE.

REFERENCES CITED

The following references are of record in the file of this patent:

UNITED STATES PATENTS

| Number | Name | Date |
|---|---|---|
| 1,020,434 | McKenna | Mar. 19, 1912 |
| 1,597,650 | Federle | Aug. 24, 1926 |
| 1,680,245 | Penn | Aug. 7, 1928 |
| 1,927,134 | Otto | Sept. 19, 1933 |
| 2,130,872 | Boehne | Sept. 20, 1938 |
| 2,193,126 | Furnas | Mar. 12, 1940 |
| 2,269,016 | Gille | June 6, 1942 |
| 2,297,626 | Lennhalm | Sept. 29, 1942 |
| 2,406,246 | Ogden | Aug. 20, 1946 |
| 2,438,745 | Fox | Mar. 30, 1948 |
| 2,458,123 | Wasserlein | Jan. 4, 1949 |